(12) United States Patent
Sampathkumar

(10) Patent No.: US 9,495,411 B2
(45) Date of Patent: Nov. 15, 2016

(54) INCREASED PARALLELISM PERFORMANCE OF BATCH REQUESTS

(71) Applicant: Jayaraman Vellore Sampathkumar, Fremont, CA (US)

(72) Inventor: Jayaraman Vellore Sampathkumar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 221 days.

(21) Appl. No.: 14/033,131

(22) Filed: Sep. 20, 2013

(65) Prior Publication Data

US 2014/0089282 A1 Mar. 27, 2014

Related U.S. Application Data

(60) Provisional application No. 61/704,788, filed on Sep. 24, 2012.

(51) Int. Cl.
*G06F 17/30* (2006.01)

(52) U.S. Cl.
CPC ... *G06F 17/30386* (2013.01); *G06F 2209/548* (2013.01)

(58) Field of Classification Search
CPC .................. G06F 17/30091; G06F 17/30386; G06F 2209/548; G06F 9/3885; H04L 49/90
USPC ........................................................ 707/705
See application file for complete search history.

(56) References Cited

U.S. PATENT DOCUMENTS

| | | | |
|---|---|---|---|
| 4,507,751 A * | 3/1985 | Gawlick | ................... G06F 9/44 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,872,970 A * | 2/1999 | Pickett | ................ G06F 11/3495 714/15 |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| 6,367,077 B1 | 4/2002 | Brodersen et al. | |

(Continued)

*Primary Examiner* — Sheree Brown
(74) *Attorney, Agent, or Firm* — Blakely, Sokoloff, Taylor & Zafman

(57) ABSTRACT

A system selectively dequeues journal requests instead of dequeuing on a first come, first served basis. A database system detects that a request for access from a client is a journal batch, which includes multiple journal requests. The system queues the journal batch in a queue with other journal batches for processing. The system selectively dequeues journal requests from the journal batch queue, including selecting at least one journal request from multiple different journal batches. Thus, the journal requests do not conflict for shared resources, and the system can improve parallelism in processing the journal batches.

20 Claims, 5 Drawing Sheets

(56) References Cited

U.S. PATENT DOCUMENTS

| | | | |
|---|---|---|---|
| 6,393,605 B1 | 5/2002 | Loomans | |
| 6,405,220 B1 | 6/2002 | Brodersen et al. | |
| 6,434,550 B1 | 8/2002 | Warner et al. | |
| 6,438,558 B1 * | 8/2002 | Stegelmann | G06F 17/30575 707/615 |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,658,596 B1 * | 12/2003 | Owen | G06F 11/1471 714/16 |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 7,930,271 B2 * | 4/2011 | Tarbell | G06F 17/30581 707/615 |
| 8,818,939 B2 * | 8/2014 | Tarbell | G06F 17/30581 707/610 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0059738 A1 * | 3/2004 | Tarbell | G06F 17/30581 |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2011/0179091 A1 * | 7/2011 | Tarbell | G06F 17/30581 707/803 |

* cited by examiner

INCREASED PARALLELISM PERFORMANCE OF BATCH REQUESTS

RELATED CASES

This application is a nonprovisional application based on U.S. Provisional Patent Application No. 61/704,788, filed Sep. 24, 2012, and claims the benefit of priority of that provisional application. Provisional Application No. 61/704,788 is hereby incorporated by reference.

FIELD

Embodiments described are related generally to database requests, and embodiments described are more particularly related to increasing parallelism of processing batch requests.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2013, Salesforce.com Inc., All Rights Reserved.

BACKGROUND

User's store data in database systems to organize large amounts of data. There are many commercially available database systems that have tools to help users to store, organize, and retrieve data of interest. In a database system, users access the database by making requests to access the database. The requests can be to read, write, or modify data in the database. In certain database implementations, a user can generate requests in batches. A batch is a group or set of requests. Batch requests allow a user to submit a single request transaction, and cause the database to access multiple different records. Thus, batches allow for much greater access efficiency for the user.

In certain applications with database systems, a user generates multiple batch requests for a database system to process, and the requests are queued and processed one at a time. The database system architecture may allow for multiple different processing managers to operate in parallel, by receiving and processing different requests. However, when the managers access jobs from the same batch, collisions can occur. A collision refers to a scenario when multiple managers attempt to lock the same resource when processing a job. The collisions traditionally require one manager to wait for the resource to become available before another manager can access it. Thus, even when a database system architecture allows for parallel processing managers to operate in parallel on batch jobs, the fact that the jobs are in batches can prevent actual parallel operations. The lack of parallelism can exist even when there are hardware processing resources available to perform the operations.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Figure 1:
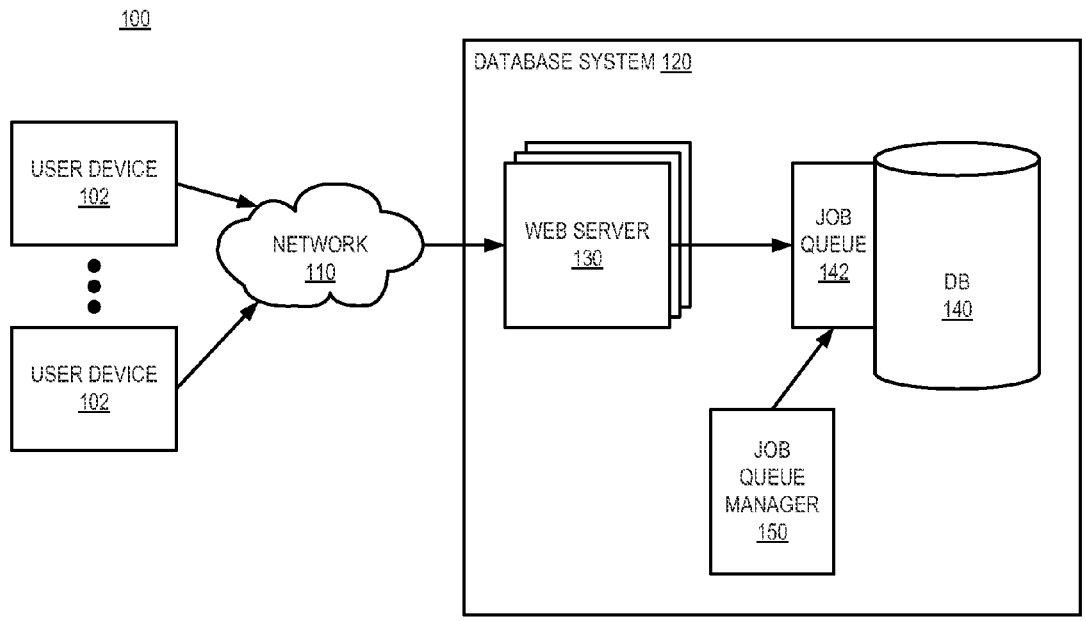
FIG. 1 is a block diagram of an embodiment of a database system with a job queue manager to improve parallelism of processing batch requests.

Descriptions of certain details and implementations follow, including a description of the figures, which may depict some or all of the embodiments described below, as well as discussing other potential embodiments or implementations of the inventive concepts presented herein. An overview is provided below, followed by a more detailed description with reference to the drawings.

DETAILED DESCRIPTION

As described herein, a system selectively dequeues journal requests instead of dequeuing on a first come, first served basis. A database system detects that a request for access from a client is a batch request, which includes multiple separate requests. The system queues the batch in a queue with other batches for processing. The system selectively dequeues individual requests from the batch queue, including selecting at least one request from multiple different batch jobs. Thus, the requests do not conflict for system resources, and the system can improve parallelism in processing the batches.

In one embodiment, the batch requests are associated with a journal application of a database. For example, Oracle General Ledger (GL) is a module within Oracle Applications. It will be understood that all trademarks used herein are the property of their owners, and are used herein solely for purposes of identification of an example, and do not imply any rights on the part of the applicant. Oracle GL and Oracle Applications are trademarks of Oracle Corporation, Redwood Shores, Calif. The users of an Oracle GL module create journal entries to record various transactions. The journal entries can be grouped into batches called Journal Batches. Each batch in a journal batch includes three information components: batch, header, and lines. In a typically GL implementation, the three information components are stored in three separate tables: the batch information in a table GL_JE_BATCHES, the header information in a table GL_JE_HEADERS, and the line information in a table GL_JE_LINES. Users can also reverse the journal entries to reverse previously entered transactions. In addition to reversing the individual journal entries, the users can reverse an entire journal batch.

When a user reverses a journal batch, Oracle GL submits multiple concurrent "Reverse Journal" requests for reversing a single journal batch. All the requests are submitted to a concurrent job processing queue. The queue can have multiple managers that can be run concurrently (e.g., 100 managers). In one embodiment, each batch has a separate row in the table GL_JE_BATCHES. However, it will be understood that during execution of each separate request of the batch, all managers executing requests from the same batch will try to capture a lock on the same row. In a default implementation, the requests are executed on a first come, first served (FCFS) basis. In the example where 100 managers execute concurrently or in parallel, the FCFS implementation can easily result in all 100 managers concurrently executing requests from the same batch for relatively long periods of time. Each manager would need to wait for the manager that currently owns the lock on the table row or other shared resource or system resource to release the lock. Thus, a 100th running request would have to wait for all previous 99 requests to be executed by managers that that owned the lock or requested the lock prior to the 100th manager. Such a wait time can significantly affect performance time and efficiency.

A job queue manager can include a dequeue agent that allows the processing managers to dequeue and process requests from multiple batches in a batch queue in a way that improves parallelism. In one embodiment, the queue allows the system to apply a hold and an unhold (referring to removing a hold from a request previously put on hold) to individual requests within the batches. In one embodiment, the system selectively holds and unholds requests to cause the processing managers to dequeue requests from different batches. By selecting requests from different batches, the system can reduce the number of processing managers executing requests with resource collisions.

In one embodiment, the database system that receives and processes the requests is a multitenant database. The multitenant database provides a "cloud architecture" that allows a user to query for data in a modern database system. As referred to herein, a multitenant database stores data for multiple client organizations, which are each identified by a tenant ID. One or more users can be associated with each tenant ID. The one or more users of each client organization access data identified by the tenant ID associated with the respective client organization. The multitenant database is typically a database stored and hosted remote from the client organization. Typically, the multitenant database is hosted by an entity (e.g., company) separate from the client organization. A multitenant database system (MTS) as described herein can be said to provide on-demand database services. An MTS is typically a hosted system that provides as much database storage and service as required by each tenant.

In an MTS implementation, each tenant ID may have a set of data associations and relationships. Thus, a query on the MTS for one tenant ID may produce different results than the identical query on the MTS for a different tenant ID. In one embodiment, the architecture of each tenant ID develops separately with custom configuration for each tenant, such as custom objects and custom indexes. For example, a UDD (user defined database) may be implemented for each tenant to store relationships and categorization data. It will be understood that typical database technologies will not necessarily apply to operations in an MTS.

FIG. 1 is a block diagram of an embodiment of a database system with a job queue manager to improve parallelism of processing batch requests. System 100 includes multiple user devices 102 that access database system 120 over network 110. User devices 102 can belong to one or more different clients or client organizations. Each client can be a separate tenant of database system 120. The user devices can access the database system via one or more requests generated, for example, via an application or web application executing on the user device. When user devices 102 access database system 120, one or more web servers 130 of database system 120 receive and process the requests. In one embodiment, servers 130 process the requests based on request type.

User device 102 represents any type of client device that may access a server system, for example, a desktop or laptop computer, a tablet, smartphone, server, or other computing device. Network 110 includes any type of network access that allows user device 102 to access database system 120. Network 110 may be or include any one or more networks such as local or wide area networks, wireless or wired, encrypted (e.g., virtual private network (VPN)) or open, on any of a variety of know or proprietary protocols, or other network. Network 110 is understood to include hardware and software components to enable remote connection of one device to another.

In one embodiment, database system 120 is or is part of an on-demand database environment. As an on-demand environment, database system 120 can provide to user device 102 the quantity of database resources needed, and when they are needed. As such, database system 120 can appear as a scalable database resource to user device 102. In one embodiment, database system 120 has at least one aspect of its configuration that is configurable and scalable for different tenants. It will be understood that fundamentally, data stored is simply data. A database (such as database 130) is a framework of how that data is stored, structured, and interpreted when stored and accessed. Thus, a database may be considered, in one embodiment, as a set of rules and procedures for storing, accessing, and manipulating data.

Each batch request generated by a user device 102 can be identified (e.g., via a header or identifier or other information) as a batch request. Server 120 can place batch requests for access to database 140 into job queue 142 by default based on the type of the batch request. In one embodiment, database 140 includes a journal, and requests can be for reverse journals. A journal refers to a ledger or other set of structured data. Data can be entered into a ledger by journal requests and/or journal batches (a collection of journal requests). Entries in a ledger can be removed (e.g., to eliminate data and/or to move it from one ledger to another) using reverse journals, which are reverse operations or operations that reverse journal request transaction or journal batch transactions.

Journal requests and/or other database requests can be queued in job queue 142. In one embodiment, job queue 142 is technically part of the implementation of database 140, rather than part of the implementation of database system 120. Thus, database system 120 can include a database implementation that includes job queue 142. In one embodiment, database 140 is an Oracle GL database, which includes a default queue (e.g., a Standard Manager Queue) to store batch requests. In one embodiment, job queue 142 is or includes the default queue. Database 140 can include multiple parallel processing managers (not shown in system 100) to process the requests from job queue 142. In one embodiment, database 140 and job queue 142 are implemented as separate instances for each tenant of database system 120.

In a typical implementation, each batch is submitted to job queue 142 one at a time as received from server(s) 130. Each later submitted batch waits for previously submitted batches to be processed before being processed by database 140. In one embodiment, database system 120 includes job queue manager 150, which is an agent or module or other executable that can alter the way job queue 142 is executed on by database 140. In one embodiment, manager 150 includes PL/SQL code executing on the database level of applications associated with database 140 (e.g., implemented on the Oracle Applications under APPS user account). In one embodiment, database system 120 invokes manager 150 when server 130 detects a specific type of request (e.g., a reverse journal batch). In one embodiment, manager 150 exits when there are no more reverse journal batch requests to be controlled and released from job queue 142 or a concurrent job queue system.

Manager 150 can change the way jobs or requests are dequeued from job queue 142. Thus, in one embodiment, manager 150 can operate in addition to or in conjunction with a default dequeuing mechanism of database 140. In one embodiment, manager 150 can replace a default dequeuing mechanism of database 140. Manager 150 causes the system to dequeue requests from different batches, instead of the default behavior of finishing an entire batch before beginning to pull requests from a subsequently received batch. Thus, the different requests executed by the processing managers come from different batches, which can reduce or eliminate contention for shared resources, such as rows of a table. Each processing manager can then lock different resources and operate in a more parallel fashion.

Figure 2:
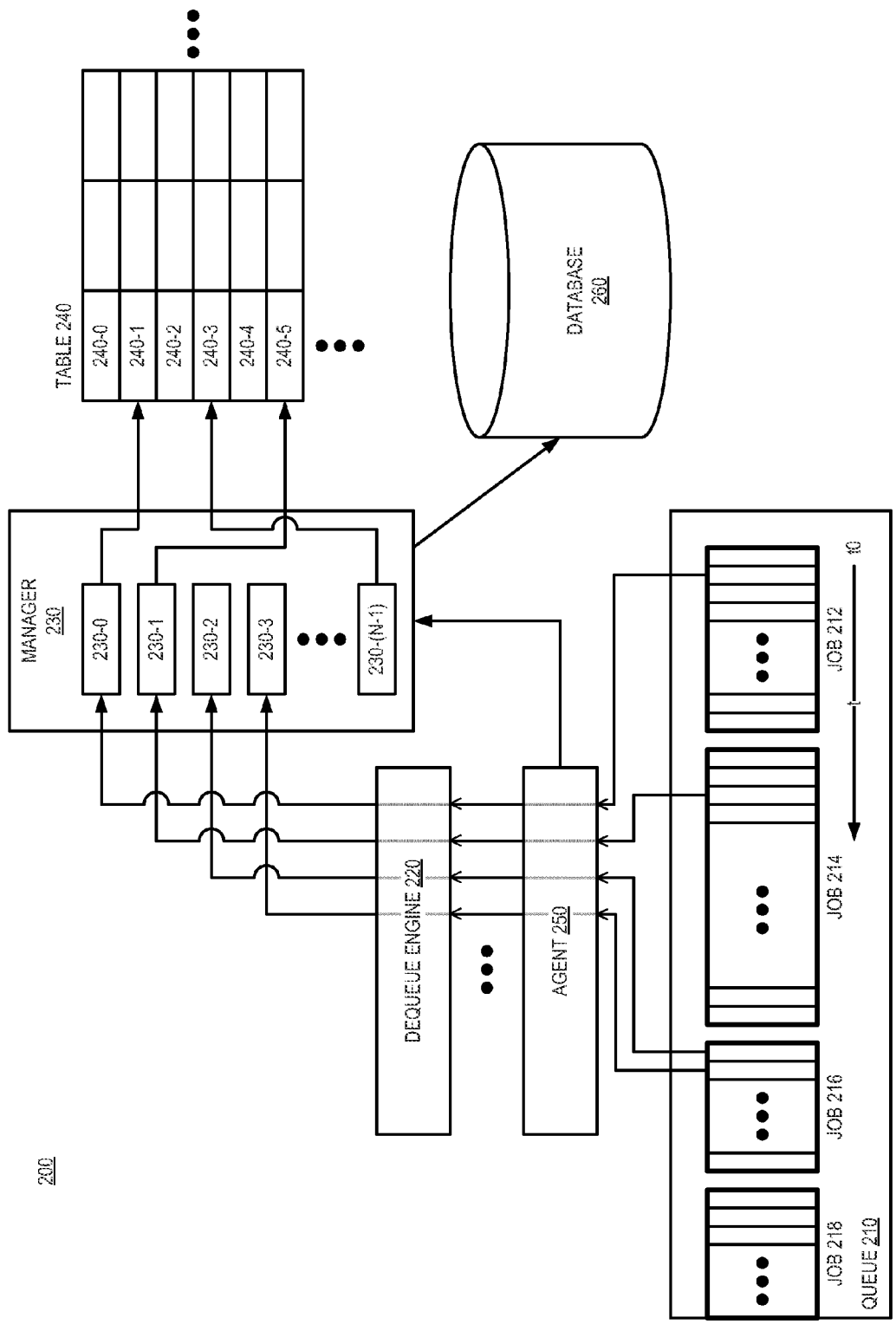
FIG. 2 is a block diagram of an embodiment of a system with a job queue manager implemented as a dequeue agent to improve parallelism of processing batch requests.

FIG. 2 is a block diagram of an embodiment of a system with a job queue manager implemented as a dequeue agent to improve parallelism of processing batch requests. System 200 can be one example of a system in accordance with system 100 of FIG. 1. System 200 illustrates certain elements of a database system that receives batch requests and processes the requests in a way to increase parallelism of execution of the batch requests.

System 200 includes queue 210, which can be one example of job queue 142 of system 100. Queue 210 includes multiple batch jobs 212, 214, 216, 218. It will be understood that an actual implementation could include dozens or hundreds of batch jobs queued for processing. For simplicity in illustration, only a small portion of queue 210 is illustrated. Queue 210 holds pending requests waiting to be picked up by a manager 230. Queue 210 includes an indication of the timing of receipt of the jobs, where job 212 was queued at some arbitrary time t0 relative to the other queues, and time increases to the left (i.e., job 214 was received subsequently to job 212 and prior to job 216, which in turn is received subsequently to job 214 and prior to job 218).

Each job (212, 214, 216, 218) includes multiple individual requests, where each request represents an access operation to execute on database 260. Table 240 stores data that managers 230 use to access data in database 260. Table 240 is shown having rows 240-0, 240-1, . . . . There can be any number of rows and columns in table 240. The rows in table 240 can provide information to identify specific data in database 260. In one embodiment, table 240 or the rows of table 240 are shared or common resources that managers 230 lock to maintain synchronization of data of database 260. However, the locking by one manager 230 can cause other manager(s) to have to wait until a particular row is unlocked to access the same row.

Managers 230 represent processing managers of system 200. Assume for the sake of discussion that manager 230-0 is a first available manager, 230-1 is a next available manager, down to 230-(N-1), which is the last manager that is or will be available to process requests currently queued in queue 210. Manager 230-(N-1) is illustrated as currently being busy processing a request that accesses row 240-3 in table 240. N can be any number, depending on available hardware resources (e.g., hardware processing resources, memory, network bandwidth, or other resources). Managers 230 are typically executed in an implementation where they share hardware resources. The number of managers, N, can vary dynamically over time, depending on a workload coming from queue 210, a priority of work in queue 210 relative to other work in the database system, and/or an amount of hardware resources allocated to managers 230.

Managers 230 receive requests dequeued by dequeue engine 220, and process the requests. In one embodiment, managers 230 acquire locks on rows of table 240, or on other shared resources in system 200 (other shared resources are not explicitly shown). Shared resources can be elements of another table, an access channel, or other resource. Managers 230 access database 260 based on rules associated with the database.

Dequeue engine 220 represents a dequeue mechanism that dequeues requests from the jobs queued in queue 210. As illustrated, dequeue engine 220 operates on a FCFS basis, by sending the first dequeued request to the first available manager (230-0), the second dequeued request to the next available manager (230-1), and so forth. It will be understood that managers 230 in system 200 are illustrated as being organized in accordance with their availability, and the labels designating the managers are not necessarily indicative of any identifier or handle used to access the managers in practice. Managers 230 can take varying amounts of time to process particular requests. Thus, for example, manager 230-2 could take a shorter amount of time to process its request than manager 230-1, and would thus be available for processing a subsequent request prior to manager 230-1.

In one embodiment, system 200 includes agent 250 to change how dequeue engine 220 receives requests from queue 210. More specifically, in one embodiment, agent 250 work in conjunction with the FCFS operation of dequeue engine 220 by providing requests to dequeue engine 220 in a different order than they were received in queue 210. In one embodiment, agent 250 selectively holds and unholds requests in queue 210. In one embodiment, agent 250 places all received requests on hold in conjunction with the requests being placed in the queue. Agent 250 can then unhold selective requests from selected batch jobs to cause dequeue engine 220 to take requests from different batches. If the only requests not on hold are requests across multiple batches, dequeue agent 220 can operate without modification and dequeue the requests in an order different from how the requests were received into queue 210. While parallelism is improved by using requests from different batches, it will be understood that multiple requests can still be dequeued from the same batch, as illustrated with respect to job 216. In one embodiment, agent 250 provides feedback to manager pool 230 to cause the system to increase or decrease the number of managers in the pool.

Consider an example in which database 260 is implemented as an Oracle GL database instance. The instance can be specific to a particular tenant or client of a database system of which database 260 is a part. In such an example, queue 210 can be implemented as a Standard Manager Queue under Oracle Applications. Manager pool 230 can be implemented as a collection of Standard Managers. Standard Managers execute by picking up requests from queue 210 that are not on hold. In one embodiment, managers 230 pick up requests from queue 210 based on a time interval. In an Oracle implementation, the interval can be defined by a sleep second setting at a Concurrent Manager definition. For example, a 30 second sleep interval indicates that the Standard Manager would pick up the pending requests every 30 seconds. The Standard Manager can pick up only as many pending requests as there are idle managers that the Standard Manager has at the end of the sleep cycle moment. Thus, in one embodiment, the requests are held in the queue until processing resources become available (a manager becomes idle). If there are 100 managers, and 80 managers are currently processing requests, 20 managers can receive requests at the end of the sleep cycle.

In the Oracle GL example implementation, a user can submit a large number of Reverse Journal Batch requests. In one embodiment, the queue places and/or keeps all submitted requests on hold. Agent 250 can release a certain number of requests from each Reverse Journal Batch to the pending queue. The number of requests is less than a total number of requests in the batch, and could be one or more. Thus, the pending queue would include requests from multiple different batches, which the Standard Manager would pick up for processing.

In one embodiment, agent 250 could be understood as cherry picking logic, which picks journal requests from different batches. In one embodiment, the system can monitor how long each journal request of each batch takes, and use that information to estimate how long it will take to process subsequent requests from the same batch. The system can monitor historical information and use the historical information to determine how to cherry pick. For example, agent 250 can choose one request from one batch over another request from a different batch based on an expectation that the selected one will complete faster than the other.

Figure 3:
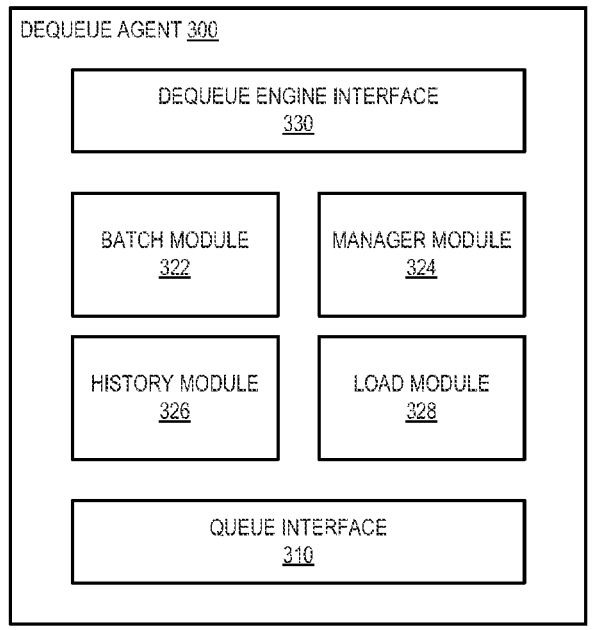
FIG. 3 is a block diagram of an embodiment of a dequeue agent that dequeues batch jobs based on a number of different factors.

FIG. 3 is a block diagram of an embodiment of a dequeue agent that dequeues batch jobs based on a number of different factors. Dequeue agent 300 can be one example of an embodiment of agent 250 of system 200. Agent 300 enables a database system to improve parallelism in processing batch jobs by selectively dequeuing requests from different batch jobs. In one embodiment, agent 300 is implemented as logic executing within a database system. In one embodiment, when a database system implements an instance of a ledger database or other database that commonly uses batch jobs to make multiple accesses to the database, the database system can execute agent 300 to run in conjunction with the database. Agent 300 monitors received requests for batch requests, and queues the batches in a batch queue. Agent 300 then coordinates selectively dequeuing the requests from the batches for processing.

Agent 300 includes queue interface 310, which represents any process or mechanism through which agent 300 can interface with a batch queue. In one embodiment, queue interface 310 includes one or more APIs (application programming interfaces) or other program calls that enable agent 300 to access a batch queue. Similarly, agent 300 includes dequeue engine interface 330, which represents any process or mechanism through which agent 300 can interface with a dequeue agent that removes requests from a batch queue. In one embodiment, agent 300 does not need an interface, per se, with a dequeue engine. For example, a dequeue engine could be configured to simply dequeue requests that are not on hold, in which case agent 300 can simply unhold specific requests, and allow the dequeue engine to operate normally.

In one embodiment, agent 300 includes one or more function modules that enable agent 300 to monitor or collect various metrics. Agent 300 can use one or more metrics to determine how to manage the dequeuing of requests from a batch queue. In one embodiment, agent 300 includes batch module 322, manager module 324, history module 326, and load module 328. In an alternative embodiment, agent 300 includes more or fewer modules, or includes other modules in place of those illustrated. Each module can include software and/or hardware logic to provide various functions and/or perform various operations. Certain functionality is described below, which should be understood as non-limiting examples of functionality.

Batch module 322 enables agent 300 to drive queue interface 310. Thus, batch module 322 can include all logic, routines, and processes needed to invoke the batch queue interface. In one embodiment, batch module 322 enables agent 300 to identify separate batches within the batch queue. Batch module 322 can associate specific metrics with specific batches for monitoring. Thus, batch module 322 can include or have access to a data structure or other data store to associate metric information with particular batches to be used in determining how to dequeue the requests from the batch queue.

Manager module 324 represents logic, routines, and/or processes by which agent 300 can access a processing manager pool. Thus, manager module 324 can invoke an interface to access the processing manager(s). Manager module 324 can enable agent 300 to collect statistical information about the operation of the managers to use in determining how to dequeue requests from the batch queue. In one embodiment, for example based on monitoring information from batch module 322, manager module 324 can indicate a need for more or fewer managers to perform processing on the queue. In one embodiment, manager module 324 includes thresholds of processing time or wait time in the queue, which if reached, trigger agent 300 to request more processing managers.

History module 326 enables agent 300 to monitor and use historical information to determine how to dequeue requests. Load module 328 enables agent 300 to monitor and use load information about the processing managers (e.g., via manager module 324) to determine how to dequeue requests. Historical information can include any information related to how long on average it takes to process a request, or a maximum or minimum amount of time to process a request. Other historical information can include a number of requests processed or how many are currently in process. Load information can include information about the number of managers or what resources are available to the managers.

It will be understood that there can be different algorithms implemented by agent 300 to determine how to dequeue requests. One example embodiment follows. In one embodiment, agent 300 monitors the batch queue for various conditions and metrics such as the number of requests currently in progress, the batch queue idle bandwidth, the number of pending requests in the queue, the number of requests currently on hold within the queue, and/or other information. In one embodiment, agent 300 determines an appropriate number of requests to be released based on collected metrics. In one embodiment, agent 300 calculates a number of requests to release for each batch individually. It will be understood that agent 300 can release or unhold more total requests than the processing managers have bandwidth to process immediately. Thus, agent 300 can unhold requests that may still sit in the queue awaiting processing resources after being released.

In one embodiment, agent 300 computes a number of request to be released from a batch in accordance with the formula:

$$\text{ceil}\left[\frac{mgr_{cnt}}{batch_{cnt}} - \text{batch\_running\_req}_{cnt}\right] + \left(\text{req\_per\_sec} * \text{ceil}\left[\frac{\text{current\_batch\_size}}{\text{average\_batch\_size}}\right]\right)$$

In the formula, ceil[ ] denotes a mathematical ceiling function; $mgr_{cnt}$ is the total number of managers available to process requests from the batch queue; $batch_{cnt}$ is the total number of batches submitted to the queue and waiting to be processed; and, $batch\_running\_reg_{cnt}$ is the total number of requests currently running in the concurrent job queue or being executed by processing managers for the particular batch. The first ceiling portion can be understood to take into account metrics related to a current state or load on the queue and/or load on the processing managers. Thus, agent 300 can dequeue requests based at least in part on a load of the computing resources in the system.

The second portion of the equation can be considered a seed factor. The seed factor adjustment can be used to compensate for an implementation where the processing managers pick up running requests at the end of a sleep cycle, instead of immediately. In an implementation where the processing managers pick up requests immediately after the processing resources become available, the agent may be able to eliminate the historical component from the calculation of how many requests to release for dequeue. It will be understood that when processing managers pick up requests at the end of a sleep cycle, there will be extra bandwidth available due to the time gap between the time the calculations were made and the time the managers actually pick up the requests. Even though the time gap would be in the order of seconds, for processing rates having a high number of requests per second, the delay would result in a large enough bandwidth to accommodate more requests.

For the historical portion or seed factor portion of the equation, ceil[ ] again denotes a mathematical ceiling function; reg_per_sec is the total number of batch requests processed per second; current_batch_size is the number of requests pending in the current batch for which the calculation is being computed; and, average_batch_size is an average of a number of requests per batch among the submitted batches in the queue. Thus, agent 300 can calculate a determination of how to dequeue the requests from the batch queue based on historical information. Among the historical data that agent 300 can use, the agent can base dequeuing on an estimate of how long jobs from a particular batch take to process.

Figure 4:
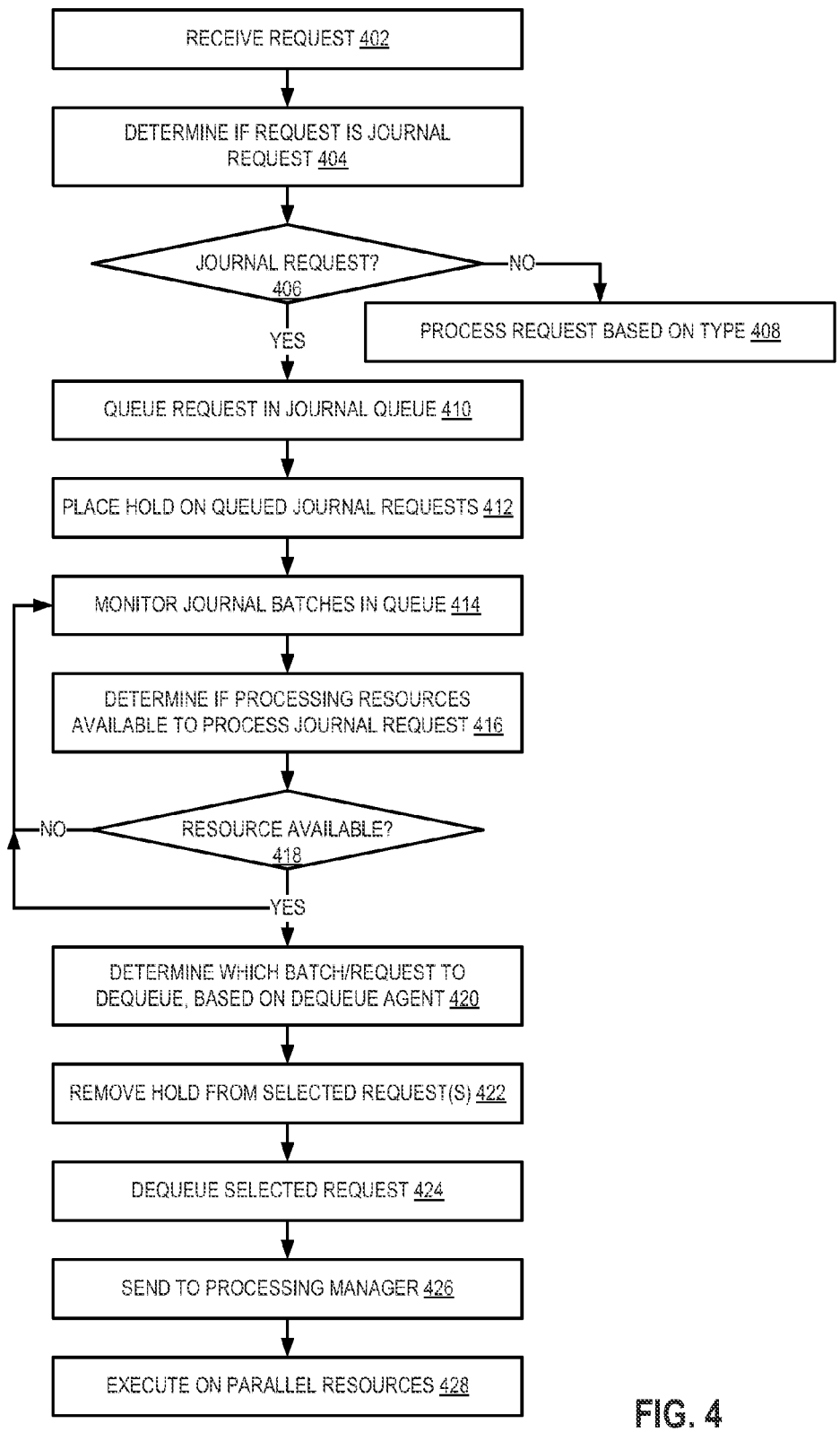
FIG. 4 represents a flow diagram of an embodiment of dequeuing batch requests.

FIG. 4 represents a flow diagram of an embodiment of queuing and dequeuing batch requests. A database system receives a request from a client device or user device, 402. The database system includes a database that the client can access with batch jobs, which include multiple individual requests. In one embodiment, the database is a journal database, and a client makes reverse journal batch requests. In one embodiment, the system monitors the types of requests received from clients and processes different types of requests differently. Thus, the system can determine if the received requests is a journal request, 404. The requests can include a header or other identifier indicating what type they are.

If the request is not a journal request, 406 NO branch, the system processes the request based on the type of the request, 408. If the request is a journal request, 406 YES branch, the system can queue the batch request in a journal batch queue, 410. The batch request will wait in the queue until processing resources are available to process the request. In one embodiment, the system places a hold on queued batch jobs, including each request in each batch, 412. The system can then selectively release or unhold the requests to allow processing resources to process them. The database system includes an agent or a module that monitors the queue and affects how requests are dequeued from the queue for processing. Thus, the system monitors the journal batches in the queue, 414.

The system can determine if there are processing resources available to process more journal requests, 416. In one embodiment, the system makes the determination by monitoring the activity of the processing managers. In one embodiment, the system triggers a sleep period, and at the end of the period any processing manager that are idle are available resources for processing the batch requests. If there are no resources available, 418 NO branch, or if it is not time to acquire requests from the queue, the system continues to monitor the journal batches in the queue, 414.

If there are resources available, 418 YES branch, the system can continue to monitor the journal batches in the queue, 414, for metrics that allow the system to determine how many and which requests to dequeue. The agent also makes a determination of which requests to dequeue, based on metrics monitored by the agent, 420. The agent increases parallelism of the processing by selecting requests from multiple different batch jobs. In one embodiment, the agent directs an unhold or release from selected requests in the queue, 422. The system dequeues the selected requests, 424, for example, by having the processing managers acquire requests from among requests that are waiting and released. Multiple requests can be released from the same batch if the agent determines it is likely they will all be processed before the system checks again for available resources. The dequeued requests are sent to the processing managers, 426, and executed on parallel or concurrently executing resources, 428.

Figure 5:
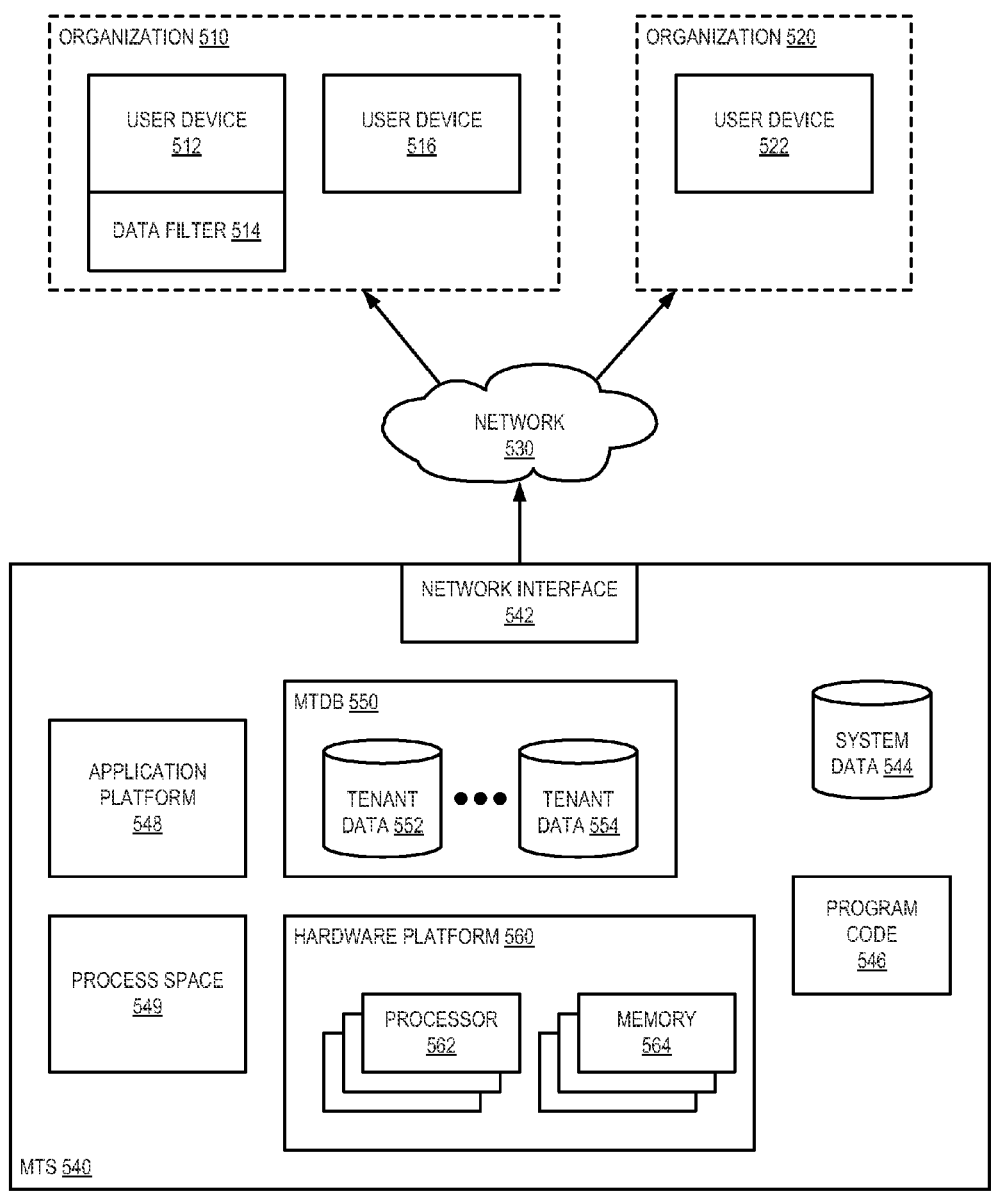
FIG. 5 is a block diagram of an embodiment of an environment for on-demand database services.

FIG. 5 is a block diagram of an embodiment of an environment for on-demand database services in which custom indexes can be applied to process an inner query. Environment 500 includes components related to an on-demand database service. Environment 500 includes multitenant database system (MTS) 540 and one or more organizations 510 and 520, which are tenants of the MTS. Each organization can include one or more users and/or user devices.

MTS 540 provides on-demand database services for environment 500. An on-demand database service, such as provided by MTS 540, is a database system that is made available to an outside user as needed by the user (e.g., on the demand of the user). Thus, a user does not necessarily need to be concerned with building and/or maintaining the database system, and rather can simply store and access data as needed from a remotely operated database system.

In one embodiment, MTS 540 stores information from one or more tenants into tables of a common database image or multitenant database (MTDB) 550. Accordingly, MTS 540 provides on-demand database service. A database image may include one or more database objects. A multitenant database stores data for various different tenants or organizations in a single database instance. Resources (such as memory, processing space, processing hardware, and other resources of the database system) are shared or allocated among the different tenants.

Multitenant database 550 includes tenant data 552, . . . , 554. The tenant data may be divided into different storage areas, which can be a physical and/or a logical arrangement of data. In one embodiment, multitenant database 550 is accessed via a relational database management system (RDBMS) or the equivalent, which executes storage and retrieval of information against the database object(s). In one embodiment, multitenant database 550 is accessed via an object-oriented database management system (OODBMS) or the equivalent. In one embodiment, multitenant database 550 is accessed via an object-relational database management system (ORDBMS) or the equivalent. It will be understood that an RDBMS manages data stored in the database based on a relational model, where data and data relationships are stored in tables. An OODBMS includes at least some integration of a database with an object-oriented programming language, and data is stored in the database in the same mode of representation as is provided in the programming language. An ORDBMS implements both a relational model and an object-oriented model, storing data in tables, and allowing representation of data consistent with a programming language.

Application platform 548 represents a framework that allows applications of MTS 540 to execute. Thus, application platform 548 includes the software components (such as an operating system) to allow execution of the applications. Hardware platform 560 provides hardware resources to enable the applications to execute on application platform 548, as well as enabling execution of management or control logic for MTS 540. In one embodiment, application platform 548 of MTS 540 enables creation, managing, and executing one or more applications developed by the provider of the on-demand database service, users accessing the on-demand database service via network 530, or third party application developers accessing the on-demand database service via network 530.

MTS 540 represents any type of system that may provide on-demand database service. In addition to application platform 548 and hardware platform 560, which includes processor resources 562 and memory resources 564, MTS 540 may include other components. MTS 540 includes network interface 542 to enable user devices to access MTS 540 over network 530. In one embodiment, MTS 540 includes system data 544, program code 546, and process space 549. System data 544 represents data specific to the running of MTS 540, rather than being tenant data. It is logically separated from the tenant storage, and may be physically separated (e.g., by designating storage areas or address ranges for system data). Program code 546 represents code to implement various functions of MTS 540, which enable the system to provide on-demand database service. Process space 549 represents a framework for executing MTS processes and tenant-specific processes, such as running applications as part of an application hosting service. It will be understood that MTS 540 may include more or fewer components than what is illustrated.

As mentioned above, environment 500 includes organizations 510 and 520, which represent tenants of MTS 540. Each organization may include one or more individual, and may be an individual or small company, up to a large corporation or organization. Thus, it will be understood that the number of user devices associated with each organization could potentially be hundreds or even thousands. Each organization is assigned a tenant identifier (ID) within MTS 540. Each tenant ID could have certain associated properties for use, depending on how the organization is configured. User device 522 is associated with organization 520, and access MTS 540 under the tenant ID of organization 520. Similarly, user devices 512 and 516 are associated with organization 510, and access MTS 540 under the tenants ID assigned to organization 510.

User devices 512, 516, and 522 may be any machine or system that is used by a user to access a database user system. For example, any of the user devices can be a handheld computing device, a mobile phone, a laptop computer, a work station, and/or a network of computing devices. Each user device can be provided with an on-demand database service from MTS 540 via network 530.

Within an organization, users may be further given access privileges and/or restrictions, as illustrated by data filter 514. As illustrated, user device 516 may access MTS 540 in accordance with whatever access is available to organization 510, while user device 512 has additional restrictions applied by data filter 514. In one embodiment, data filter 514 may additionally or alternatively provide specific user interface features for user 512 in accessing data from MTS 540.

The users of user devices 512, 516, and 522 may differ in their respective capacities, and the capacity of a particular user device might be entirely determined by permissions (permission levels) for the current user. For example, where a salesperson is using a particular user device to interact with MTS 540, that user device has the capacities assigned to that salesperson. However, an administrator using the same user device may have different capacities assigned to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Such enforcement could occur based on data filter 514, which can filter per device and/or could filter for the entire organization (e.g., a central filter as opposed to distributed filtering).

Network 530 represents any network or combination of networks. A network is generically an interconnection of devices that communicate with each other. Network 530 can be or include any combination of a LAN (local area network), WAN (wide area network), telephone network, wireless network, point-to-point network, star network, token ring network, hub network, or other appropriate configuration. TCP/IP (Transfer Control Protocol and Internet Protocol) networks are commonly used, such as the global internetwork of networks often referred to as the "Internet." Reference to specific networks in certain examples herein is meant only to provide examples, and is not limiting.

In one embodiment, user devices 512, 516, 522 (and other user devices not shown) communicate with MTS 540 over network 530 using TCP/IP and, at a higher network level, use other common protocols to communicate, such as HTTP (HyperText Transfer Protocol), FTP (File Transfer Protocol), AFS (Andrew File System—a distributed network filesystem using trusted servers), WAP (Wireless Access Protocol). In an example where HTTP is used, user device 512 might include an HTTP client commonly referred to as a "browser" for sending and receiving HTTP messages to and from an HTTP server at MTS 540 (not specifically shown, but which could be executed on hardware platform 560). Such an HTTP server might be implemented as the sole network interface between MTS 540 and network 530, but other techniques might be used as well or instead. In one embodiment, the interface between MTS 540 and network 530 includes load sharing functionality, such as round-robin HTTP request distributors to balance loads and distribute incoming HTTP requests evenly over a plurality of servers. At least as for the users that are accessing that server, each of the plurality of servers has access to data in MTS 540; however, other alternative configurations may be used instead.

In one embodiment, MTS 540 implements a web-based customer relationship management (CRM) system. For example, in one embodiment, MTS 540 includes application servers configured to implement and execute CRM software applications as well as provide related data, code, forms, webpages and other information to and from user devices (e.g., 512, 516, 522) and to store to and retrieve from a database system related data, objects, and webpage content. With a multitenant system, data for multiple tenants may be stored in the same physical database object; however, tenant data is typically arranged so that data of one tenant is kept logically separate from that of other tenants. The logical separation prevents one tenant from having access to another tenant's data. An express sharing of data among tenants is possible, which removes the logical separation. In one embodiment, MTS 540 implements applications other than or in addition to a CRM application. For example, MTS 540 may provide tenant access to multiple hosted (standard and custom) applications, including a CRM application. User (or third party developer) applications, which may or may not include CRM, may be supported by application platform 548, which manages creation, storage of the applications into one or more database objects and executing of the applications in a virtual machine in process space 549 of MTS 540.

In one embodiment, MTS 540 is configured to provide webpages, forms, applications, data and media content to user (client) device to support the access by user devices as tenants of MTS 540. In one embodiment, MTS 540 provides security mechanisms to keep each tenant's data separate unless the data is shared. More than one MTS may be used. If more than one MTS is used, the multiple systems may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" refers to a computer system, including processing hardware and process space(s), and an associated storage system and database application (e.g., OODBMS, RDBMS, ORDBMS) as is known in the art. It will be understood that "server system" and "server" are often used interchangeably herein. Similarly, a database object described herein can be implemented as single databases, a distributed database, a collection of distributed databases, a database with redundant online or offline backups or other redundancies, and might include a distributed database or storage network and associated processing intelligence or logic.

A database of MTS 540 can be a database that one or more user devices 512, 516, 522, access with batch jobs. One or more resources, such as tables of MTDB 550 can be common resources that are locked by processing managers that execute in process space 549. In one embodiment, an agent executes in process space 549 to determine how to dequeue batch requests from queued batch jobs submitted by the user devices. An agent can dequeue the request or prepare the requests for dequeuing in accordance with any embodiment described herein.

Figure 6:
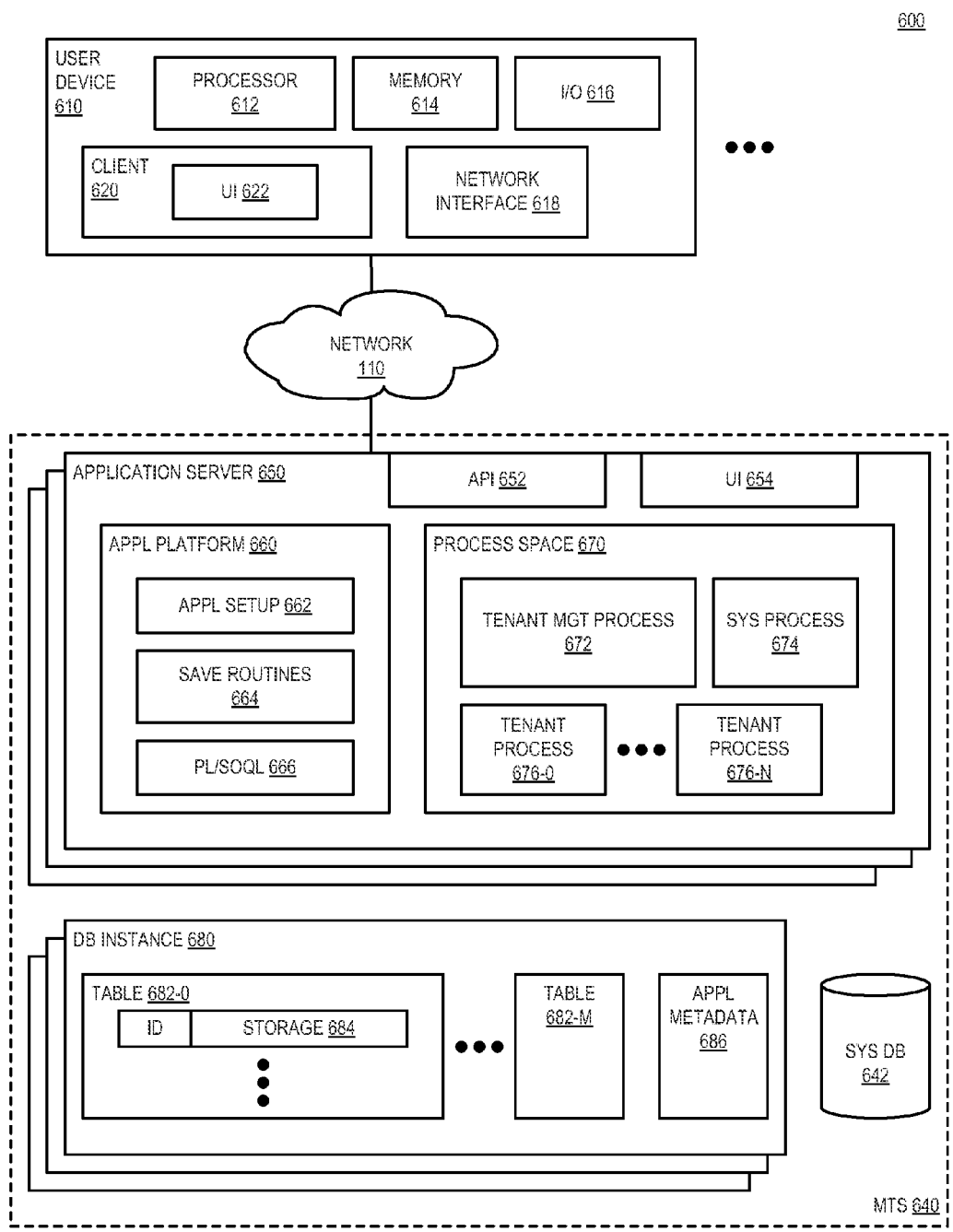
FIG. 6 is a block diagram of an embodiment of an environment for on-demand database services with a multitenant database having multiple data tables.

FIG. 6 is a block diagram of an embodiment of an environment for on-demand database services with a multitenant database having multiple data tables in which custom indexes can be applied to process an inner query. Environment 600 includes components related to providing an on-demand database service, and may be one example of environment 500 of FIG. 5, with additional components shown. Environment 600 includes one or more multitenant database systems (MTS) 640 and one or more tenants of the MTS, as illustrated by user device 610. User device 610 is generally part of an organization that is the tenant, and user device 610 provides a computing device through which access to MTS 640 is available. MTS 640 provides on-demand database services for environment 600.

Environment 600 may include conventional, well-known elements that are explained only briefly here. For example, user device 610 (and any other user devices through which users access MTS 640) could include a desktop personal computer, workstation, laptop, handheld device, cell phone or smart phone, or any wireless access protocol (WAP) enabled device or any other computing device capable of interfacing directly or indirectly to the Internet or other network connection.

User device 610 includes processor 612, which represents one or more processor devices, and may be any combination of one or more processors. Processor 612 provides hardware means to execute programs and applications on user device 610. Memory 614 represents a memory system for user device 610, and may be any combination of one or more memory devices, short term, and/or long term memory. I/O (input/output) 616 represents any type of input and output devices such as keyboards, pointers and controllers, touchscreens, buttons, microphones, or other input mechanisms, and monitors, screens, printers, interfaces to networks, and/or other output devices.

User device 610 includes network interface 618, which represents hardware interconnections and control logic and circuitry to enable user device 610 to connect to network 630. Network interface 618 also has associated drivers and possibly other software components to allow user programs to interface with the interconnection hardware. User device 610 includes client 620, which represents a program that allows a user of user device 610 to access information from network 630, such as accessing MTS 640. UI 622 represents a user interface component of client 620, or a user interface in which information from client 620 is presented on user device 610. Thus, UI 622 may be integrated with client 620, or it may be separate from client 620, but display data related to the execution of client 620. UI 622 is rendered on display or user interface hardware or device, which can be understood to be represented by UI 622.

In one embodiment, user device 610 runs an HTTP client as client 620. An HTTP client may be, for example, a browsing program or a browser, which may include a WAP-enabled browser in the case of a cell phone, PDA or other wireless device. The HTTP client allows a user (e.g., subscriber of MTS 640) of user device 610 to access, process, and view information, pages, and applications available from MTS 640 over network 630, based on permissions and privileges. The user interface device of user device 610 can be used to access data and applications hosted by MTS 640, and to perform searches on stored data, and otherwise allow a user to interact with various GUI (graphical user interface) pages that may be presented to a user.

Similar to what is discussed above with reference to network 530 of environment 500, network 630 represents any network or group of networks over which access can be provided to MTS 640. Network 630 may include switching and/or routing elements, cables, connectors, and other components. In one embodiment, at least part of network 630 is the Internet, referring to a specific global internetwork of networks. However, it should be understood that other networks can be used in addition to or instead of the Internet, such as an intranet, an extranet, a virtual private network (VPN), a non-TCP/IP based network, any LAN or WAN or other network.

In one embodiment, user devices such as user device 610 (which may be client systems) communicate with application server 650 to request and update system-level and tenant-level data from MTS 640 that may require sending one or more queries to tenant data storage in database instance 680 and/or system data in system database 642. In one embodiment, MTS 640 (e.g., application server 650) automatically generates one or more SQL statements (e.g., one or more SQL queries) designed to access the desired information. System data storage in system database 642 may generate query plans to access the requested data from database instance 680.

In one embodiment, MTS 640 includes one or more application servers 650. From one perspective, application server 650 can be considered a network interface of MTS 640 to connect to network 630. Application server 650 exchanges (i.e., receives and/or transmits) data with network 630, such as receiving requests and sending replies or sending data. Application servers 650 may share hardware resources for interfacing with network 630, or they may be assigned separate resources. In one embodiment, one or more of application servers 650 can be implemented as an HTTP application server.

In one embodiment, each application server 650 is configured to handle requests for any user associated with any organization that is a tenant. Thus, a request from user device 610 could be received and processed at any application server 650. There may be advantages to avoiding affinity for a user and/or an organization or tenant to a specific application server 650, such as the ability to add and remove application servers from a server pool at any time for any reason, as well as for workload balancing among the servers. In an implementation where user and/or tenant affinity is used, an application server could not be removed without completing its jobs and/or handing off users to another server.

In one embodiment, an interface system implementing a load balancing function (e.g., an F5 Big-IP load balancer) is communicably coupled between application servers 650 and the user devices to distribute requests to the application servers 650. In one embodiment, the load balancer uses a least connections algorithm to route user requests to the application servers 650. Other examples of load balancing algorithms, such as round robin and observed response time, also can be used. For example, in certain embodiments, three consecutive requests from the same user could hit three different application servers 650, and three requests from three different users could hit the same application server 650. In this manner, MTS 640 is multitenant, wherein MTS 640 handles storage of, and access to, different objects, data, and applications across disparate users and organizations. In one embodiment, Each application server 650 includes elements to provide database access service and request processing. Application server 650 includes API (application programming interface) 652 and UI 654. UI 654 represents server-side components that provide user interface elements that are provided to user device 610 for display. API 652 provides an interface for users and/or developers to access resident processes of MTS 640.

In one embodiment, application server 650 includes application (appl) platform 660, which provides a sub-environment on which applications hosted by application server 650 can be executed. Application platform 660 may include an operating system or other control logic, as well as business logic and common routines for use by the applications. As illustrated, application platform 660 includes application setup mechanism 662 that supports creation and management of applications, including configuration, by application developers, which may be saved as metadata into tenant data storage of database (db) instance 680. Save routines 664 represent the mechanisms used to store data in database instance 680, such as storing the application setup metadata. Such applications can be executed by subscriber users, for example, in process space 670.

In one embodiment, invocations to or related to such applications may be coded using PL/SOQL (Procedural Language/Salesforce Object Query Language) that provides a programming language style interface extension to API 652. Thus, PL/SOQL 666 is capable of serving as a procedural extension to an on-demand database centric service API that allows flow control and transaction control to execute on a server in conjunction with database APIs (e.g., SOQL, data manipulation language (DML), or others). PL/SOQL 666 can enable the capability to thread together multiple SOQL/DML statements as a single unit of work on the server. PL/SOQL 666 need not necessarily be considered a general purpose programming language, seeing that it may be implemented as heavily data focused, but is not necessarily implemented that way. In one embodiment, PL/SOQL 666 can be used by developers to interlace with an on-demand database system, in contrast to traditional application developers' conventional tools, such as PL/SQL (Structured Query Language) of ORACLE, Inc. of Redwood Shores, Calif., and others.

In one embodiment, PL/SOQL 666 includes variable and expression syntax, block and conditional syntax, loop syntax, object and array notation, pass by reference, and other syntax known to other programming languages. Thus, full control over syntax and the ability to reference dynamic schema elements is provided with a new language and runtime for database services. Where embedded concepts that interface with on-demand database applications are provided, syntax and semantics that are easy to understand and which encourage efficient use of database APIs may also be employed. In one embodiment, PL/SOQL 666 is implemented as a strong typed language with direct (non-quoted) references to schema objects such as Object and Field names (both standard and custom).

More details about PL/SOQL language embodiments is discussed in commonly owned U.S. Provisional Patent Application 60/828,192 entitled, PROGRAMMING LANGUAGE METHOD AND SYSTEM FOR EXTENDING APIs TO EXECUTE IN CONJUNCTION WITH DATABASE APIs, by Craig Weissman, filed Oct. 4, 2006, now expired, which is incorporated in its entirety.

In one embodiment, invocations to applications may be detected by one or more system processes, which manage retrieving application metadata 686 for the subscriber making the invocation and executing the metadata as an application in a virtual machine. Metadata 686 provides data related to access and/or use of data stored in database instance 680. In one embodiment, metadata is stored in a separate table within database instance 680, and in an alternative embodiment, metadata 686 is stored with other data elements of user storage (such as with user storage 684 of table 682-0.

In one embodiment, application server 650 includes process space 670, which may include tenant process spaces 676-0 through 676-N (for some integer number N of process spaces configured in application server 650), tenant management process space 672 and system process space 674. It will be understood that process space 670 is an abstraction to illustrate the resources allocated for execution of processes (e.g., programs or applications) within application server 650. The skilled reader recognizes that memory and processor and other hardware resources may need to be allocated, as well as software resources to support the execution of a process. The processes may be executed as separate threads, or may share a thread. In one embodiment, the number N of tenant processes is equal to a number of subscriber tenants. In another embodiment, the number N of tenant processes may be higher than the number of subscriber tenants. Tenant management process 672 provides management of the other processes, including determining when certain processes execute. System process 674 executes operations related to functions of MTS 640.

Each application server 650 may be configured to tenant data storage in database instance 680 and the tenant data stored therein, and to system data storage of system database 642 and the system data stored therein to serve requests of user devices. As mentioned above, in one embodiment, tenant data is separated logically, and stored in the same multitenant database. In one embodiment, database instance 680 stores data in tables 682-0 through 682-M, where M is some integer number of tables. In one embodiment, different tables store data of different types. Application metadata 686 may be implemented as a separate table. Alternatively, one of the tables 682-0 through 682-M could be a table that stores varying types of objects, which are defined through metadata stored in the table.

In one embodiment, database instance is further implemented with user storage space distinct (e.g., identifiable) from its associated tenant. Thus, for example, user data may include the tenant ID, as well as an identifier specific to a user. Thus, storage 684 may represent either or both of tenant storage or user storage. For example, a copy of a user's most recently used (MRU) items might be stored to in user storage within database instance 680. Similarly, a copy of MRU items for an entire organization that is a tenant might be stored to a tenant storage area of database instance 680. In one embodiment, the tenant data and the system data (as illustrated by system database 642) are stored in separate databases.

Application servers 650 may be communicably coupled to database systems, e.g., having access to system database 642 and tenant database instance 680, via a different network connection. For example, one application server may be coupled via a network (e.g., the Internet), another application server might be coupled via a direct network link, and another application server might be coupled by yet a different network connection. The application servers may connect to the database systems via TCP/IP or another transport protocol, at least partially depending on the network interconnect used.

Regarding storage in database instance 680, one tenant might be a company that employs a sales force where each salesperson uses MTS 640 to manage their sales process. Thus, a user might maintain contact data, leads data, customer follow-up data, performance data, goals and progress data, and other data, all applicable to that user's personal sales process (e.g., storage 684, which may be tenant storage). Thus, all of the data and the applications to access, view, modify, report, transmit, calculate, or perform other operations can be maintained and accessed via a user device having nothing more than network access. In an example of an MTS arrangement, the user can manage his or her sales efforts and cycles from any of many different user devices. For example, if a salesperson is visiting a customer and the customer has a lobby with Internet access, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 640 that are allocated at the tenant level while other data structures might be managed at the user level. Because MTS 640 may support multiple tenants including possible competitors, MTS 640 should have security protocols that keep data, applications, and application use separate. Additionally, because many tenants may opt for access to an MTS rather than maintain their own system, redundancy, up-time, and backup are additional functions that may be implemented in MTS 640. In addition to user-specific data and tenant specific data, MTS 640 may also maintain system level data usable by multiple tenants or other data. Such system level data might include industry reports, news, postings, and the like that are sharable among tenants.

In one embodiment, each database instance 680 can be viewed as a collection of objects, such as a set of logical tables, containing data fitted into predefined categories. A "table" is one representation of a data object, and may be used herein to simplify the conceptual description of objects and custom objects according to what is described herein. It should be understood that "table" and "object type" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, or other information. Another table might describe a purchase order, including fields for information such as customer, product, sale price, date, or other fields. In one embodiment, a multitenant database has standard entity tables for use by all tenants. For CRM database applications, such standard entities might include tables for Account, Contact, Lead, and Opportunity data, each containing pre-defined fields. Thus, tables 682-0 through 682-M may include standard, defined tables.

In one embodiment, tenants may be allowed to create and store custom objects, or they may be allowed to customize standard entities or objects, for example by creating custom fields for standard objects, including custom index fields.

U.S. patent application Ser. No. 10/817,161, filed Apr. 2, 2004, entitled "Custom Entities and Fields in a Multi-Tenant Database System", teaches systems and methods for creating custom objects as well as customizing standard objects in a multitenant database system. In one embodiment, for example, all custom entity data rows are stored in a single multitenant physical table, which may contain multiple logical tables per organization. It is transparent to customers that their multiple "tables" are in fact stored in one large table or that their data may be stored in the same table as the data of other customers.

A database instance 680 of MTS 640 can be a database that one or more user devices 610 access with batch jobs. One or more resources, such as tables 682 can be common resources that are locked by processing managers that execute in process space 670. In one embodiment, an agent executes in process space 670 to determine how to dequeue batch requests from queued batch jobs submitted by the user devices. The agent makes the determination based on monitored performance or statistical information. An agent can dequeue the request or prepare the requests for dequeuing in accordance with any embodiment described herein.

Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments; thus, not all actions are required in every implementation. Other process flows are possible.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations without departing from their scope. Therefore, the illustrations and examples herein should be construed in an illustrative, and not a restrictive sense.

What is claimed is:

1. A method comprising:
   detecting, with one or more processors, that a request for access to a database system includes a journal batch to reverse previous journal transactions, wherein the journal transactions function to cause ledger entries within the database system;
   queuing the journal batch to reverse previous journal transactions and the corresponding ledger entries in a journal batch queue with other journal batches, wherein the journal batch queue is part of the database system, wherein each journal batch request includes multiple journal requests, and wherein queuing the journal batch comprises submitting multiple concurrent journal requests for reversing a previous journal batch;
   placing all received requests to reverse previous journal transactions on hold in conjunction with the requests to reverse previous journal transactions being placed in the queue;
   removing the hold from one or more individual requests to reverse corresponding ledger entries from within the multiple different batches;
   selectively dequeuing, with the one or more processors, journal requests that have been removed from hold from the journal batch queue, including selecting at least one journal request from multiple different journal batches; and
   executing the selected journal requests on parallel hardware computing resources of the database system to reverse previous journal request transactions.

2. The method of claim 1, wherein the journal batch is a reverse journal batch that moves a database journal entry from one system to another.

3. The method of claim 1, wherein queuing the journal batch further comprises putting a hold on the journal batch, including its multiple journal requests.

4. The method of claim 1, wherein selectively dequeuing the journal requests further comprises unholding the selected journal requests.

5. The method of claim 1, wherein selectively dequeuing the journal requests further comprises selectively dequeuing based on historical data.

6. The method of claim 5, wherein selectively dequeuing the journal requests based on historical data further comprises selectively dequeuing based on an estimate of how long jobs from a particular journal batch take to process.

7. The method of claim 1, wherein selectively dequeuing the journal requests further comprises selectively dequeuing based on computing resource load.

8. An article of manufacture comprising a non-transitory computer readable storage medium having content stored thereon, which when executed, are configurable to cause a machine to perform operations including:
   detecting, with one or more processors, that a request for access to a database system includes a journal batch to reverse previous journal transactions, wherein the journal transactions function to cause ledger entries within the database system;

queuing the journal batch to reverse previous journal transactions and the corresponding ledger entries in a journal batch queue with other journal batches, wherein the journal batch queue is part of the database system, wherein each journal batch request includes multiple journal requests, and wherein queuing the journal batch comprises submitting multiple concurrent journal requests for reversing a previous journal batch;

placing all received requests to reverse previous journal transactions on hold in conjunction with the requests to reverse previous journal transactions being placed in the queue;

removing the hold from one or more individual requests to reverse corresponding ledger entries from within the multiple different batches;

selectively dequeuing, with the one or more processors, journal requests that have been removed from hold from the journal batch queue, including selecting at least one journal request from multiple different journal batches; and executing the selected journal requests on parallel hardware computing resources of the database system to reverse previous journal request transactions.

9. The article of manufacture of claim 8, wherein the journal batch is a reverse journal batch that moves a database journal entry from one system to another.

10. The article of manufacture of claim 8, wherein the content for queuing the journal batch further comprises content for putting a hold on the journal batch, including its multiple journal requests.

11. The article of manufacture of claim 8, wherein the content for selectively dequeuing the journal requests further comprises content for unholding the selected journal requests.

12. The article of manufacture of claim 8, wherein the content for selectively dequeuing the journal requests further comprises content for selectively dequeuing based on historical data.

13. The article of manufacture of claim 8, wherein the content for selectively dequeuing the journal requests based on historical data further comprises content for selectively dequeuing based on an estimate of how long jobs from a particular journal batch take to process.

14. The article of manufacture of claim 8, wherein the content for selectively dequeuing the journal requests further comprises content for selectively dequeuing based on computing resource load.

15. A computer system comprising:

network interface hardware to connect to a database system; and one or more processors configured to execute a request processing application for the database system, further configurable to detect, with one or more processors, that a request for access to a database system includes a journal batch to reverse previous journal transactions, wherein the journal transactions function to cause ledger entries within the database system;

queue the journal batch to reverse previous journal transactions and the corresponding ledger entries in a journal batch queue with other journal batches, wherein the journal batch queue is part of the database system, wherein each journal batch request includes multiple journal requests, and wherein queuing the journal batch comprises submitting multiple concurrent journal requests for reversing a previous journal batch;

place all received requests to reverse previous journal transactions on hold in conjunction with the requests to reverse previous journal transactions being placed in the queue;

remove the hold from one or more individual requests to reverse corresponding ledger entries from within the multiple different batches;

selectively dequeue, with the one or more processors, journal requests that have been removed from hold from the journal batch queue, including selecting at least one journal request from multiple different journal batches; and execute the selected journal requests on parallel hardware computing resources of the database system to reverse previous journal request transactions.

16. The computer system of claim 15, wherein the journal batch is a reverse journal batch that moves a database journal entry from one system to another.

17. The computer system of claim 15, wherein to queue the journal batch further comprises to put a hold on the journal batch, including its multiple journal requests.

18. The computer system of claim 15, wherein to selectively dequeue the journal requests further comprises to unhold the selected journal requests.

19. The computer system of claim 15, wherein to selectively dequeue the journal requests further comprises to selectively dequeue based on historical data.

20. The computer system of claim 15, wherein to selectively dequeue the journal requests further comprises to selectively dequeue based on computing resource load.

* * * * *